Figure 1:
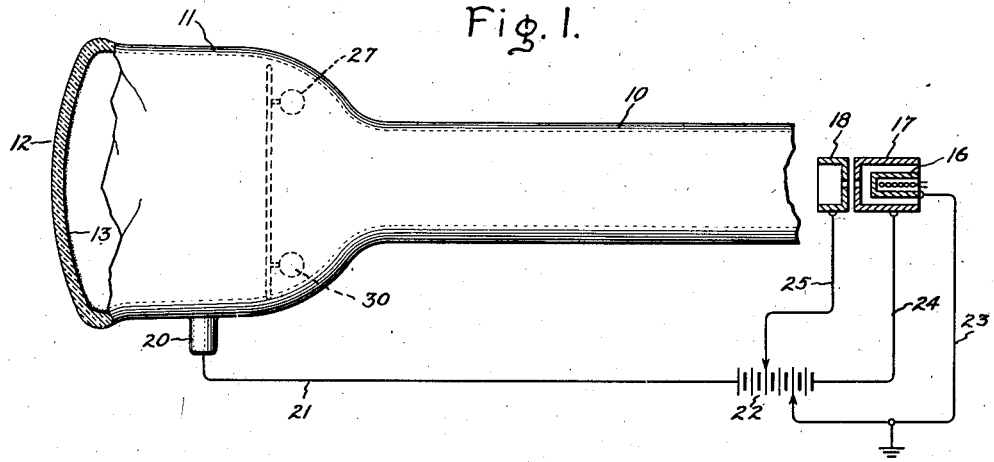

Feb. 25, 1947.  G. R. FONDA  2,416,574
DISCRIMINATIVE ALKALI HALIDE SCREEN
Filed April 8, 1943

ALKALI HALIDE COATINGS
FORMING TRACES OF
CONTRASTING COLOR AND
UNLIKE PERSISTENCE

COATINGS OF MIXED ALKALI
HALIDES FORMING TRACES
OF CONTRASTING COLOR
AND UNLIKE PERSISTENCE

Inventor:
Gorton R. Fonda,
by *Harry E. Dunham*
His Attorney.

Patented Feb. 25, 1947

2,416,574

UNITED STATES PATENT OFFICE 2,416,574

DISCRIMINATIVE ALKALI HALIDE SCREEN

Gorton R. Fonda, Schenectady, N. Y., assignor to General Electric Company, a corporation of New York Application April 8, 1943, Serial No. 482,276

8 Claims. (Cl. 250—164)

The present invention relates to cathode ray devices of the skiatron type, that is, devices containing screens or films of alkali halide which are sensitive to cathode ray (electron) bombardment. As the image or "trace" made by a cathode ray beam on alkali halide consists of a coloration rather than of an emission of light, as in the case of a fluorescent screen, it is customary to refer to cathode ray tubes containing alkali halide screens as "dark trace" tubes.

As a matter of fact, such halide traces have distinguishable colors. For example, a cathode ray trace formed on potassium chloride is magenta in color, whereas the trace formed on rubidium chloride is green. The so-called decay period; that is, the length of time required for the traces to fade out after excitation has ceased, is also unlike for different halides.

In accordance with my present invention these properties have been utilized in cathode ray tube halide screens wherein the contrasting colors as well as the form of the cathode ray traces give valuable information.

For example, in one class of range-finding and direction-finding equipments electromagnetic waves are radiated and if these radiations are reflected by an object a corresponding image or trace is formed on the screen of a cathode ray tube forming part of such equipment.

In order to properly interpret such visible images or traces it is desirable not only that they should persist long enough to be noted by an observer, but it is also desirable that a trace produced by the reflection of radiations from a moving object should contrast with a trace produced by reflections from a stationary object. It is also desirable that traces produced by moving objects should indicate on the screen the direction of motion of such objects.

In cathode ray tubes embodying my invention traces produced by moving objects have a color differing from traces produced by stationary objects; also traces produced by moving objects have a different color as well as different intensity at or near the origin of the traces than at the point where the latest position of the moving object is indicated. These color contrasts are produced by the combination in the screen of a cathode ray tube of alkali halides responding with different colors to excitation by cathode rays as well as having different rates of decay.

Novel features of invention, which is not restricted to range- or direction-finding equipment, are pointed out with greater particularity in the appended claims. A more complete understanding of my invention may be had from the following description taken in connection with the accompanying drawing.

Figure 2:
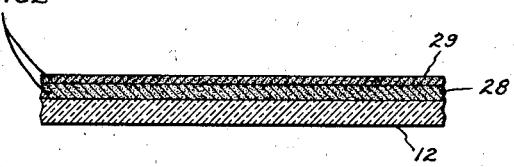
Figure 3:
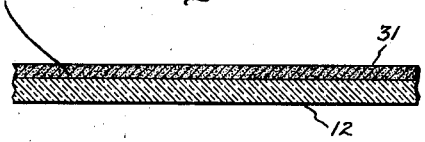

Fig. 1 of the drawing is a conventionalized side view of a cathode ray tube as illustrative of a device embodying my invention; and Figs. 2 and 3 are enlarged sectional views conventionally illustrating screens embodying my invention.

Referring particularly to Fig. 1, there is shown schematically a cathode ray tube comprising a glass envelope which has a relatively slender stem portion 10 and an enlarged bulbous portion 11. The latter portion is provided with a window 12 through which an observer may view a luminescent screen which is applied to the inner surface of the window as indicated at 13. The nature of the screen will be explained in detail at a later point.

At the end of the envelope remote from the screen 13 there is provided an arrangement for generating a cathode ray beam (i. e., a concentrated stream of electrons). The means employed for this purpose may comprise any conventional type of electron gun. In the present instance the electron source is illustrated diagrammatically as comprising an electrically heated cathode 16 which is enclosed within a control or focusing cylinder 17. Ordinarily the cathode electron emission is enhanced by a coating of oxides of alkaline earths as well understood. Adjacent the cylinder 17 there is provided an apertured electrode or grid 18 which is adapted to be maintained at a positive potential with reference to the cylinder and which has the function of initially accelerating the electrons developed by the cathode 16 toward the screen 13. Final acceleration of the electrons is provided by a high voltage anode consisting of a layer (not shown) of colloidally suspended graphite or other appropriate conductive material deposited on the inner lateral wall surface of the tube envelope. A terminal connection 20 for this conductive layer is provided for a lead-in conductor 21. Connection of the parts of the electron gun and the anode to a source of energy 22 by the conductors 23, 24 and 25 has been conventionally indicated.

Such apparatus for present purposes may be assumed to comprise the elements of a range- and direction-finding equipment, although my invention is applicable to other fields, as for example the television field. Depending upon the nature of the potentials impressed upon the equipment with which the cathode ray tube is used, the cathode ray beam may be caused to develop varying traces upon the screen 13, which traces may be interpreted by an informed observer in terms of the factors desired to be ascertained by the use of the equipment.

Satisfactory screens embodying the present invention will be illustrated by the following illustrative examples.

A film of potassium chloride or lithium iodide first is deposited by volatilization from a holder 27 on the surface of a non-conductive, transparent support, such as the glass window 12 of the cathode ray tube. This layer may comprise approximately about 1 to 3 milligrams per square centimeter, which expresses approximately the customary thickness of single layer screens such as heretofore used in cathode ray tubes. On foundation layer 28, Fig. 2, a second layer 29 of either rubidium chloride or potassium bromide is deposited from a holder 30, Fig. 1. This second layer 29, as indicated in Fig. 2, is very much thinner than the foundation layer and should be such as to permit of penetration thereof by at least part of the electron beam. The holders 27 and 30 in which pellets of the desired halide are placed during assembly of the tube parts are heated by locally applied high frequency.

The color of a trace or image produced by electrons in the foundation film is dark in color. The potassium chloride coloration is magenta and the coloration of lithium iodide which may be used alternatively is brownish-black. The persistence or rates of decay of either one of these halides is long, the lithium iodide especially having a very long persistence.

Both the color and the persistence of traces formed on the second or top layer are contrasting with the lower layer. Both species of top layers respond to electron impact by forming greenish-colored traces, the potassium bromide trace being bluish-green. Both top layer halides are characterized by rapid decay; that is, short persistence of traces formed thereon. Hence, such a compound film exhibits initially upon receiving the impact of electrons a greenish or greenish-blue trace which quickly changes as the color formed on the top layer fades to a vanishing point leaving a dark-colored trace of longer persistence characteristic of the foundation layer. Consequently a moving object is denoted by a series of traces, the most recent of which is greenish in color and the older ones of which become progressively browner to an extent depending upon their age. These traces of changing color facilitate observations on the change in position of the moving object. Furthermore, they serve to distinguish it from a stationary object because every pulse of the cathode ray beam which responds to radiation reflected from such a stationary object will impinge upon the same spot on the screen so that the corresponding trace is mainly greenish in color. The shorter the time interval between pulses, the greener is the coloration and the less noticeable is any alteration in color toward magenta. By contrast with such a trace, a moving object is represented by a succession of traces whose color fades into magenta or brown.

The rate of decay of the cathode ray trace of the top layer may be further decreased by associating the short persistence halide, as for example rubidium chloride or potassium bromide, with a minor amount, ordinarily less than 10 per cent, of a foreign halide. For the foreign halide I prefer to employ the chloride of magnesium or the chloride of barium, although for some purposes the chlorides of other metals may be used, such as samarium, thallium, manganese, sodium, cadmium, lead, chromium, nickel, platinum, caesium, calcium, aluminum, iron, thorium, lithium, rubidium, copper, zinc, zirconium or tin. Ordinarily the period of decay becomes progressively shorter (within limits) with increase of modifier. Ordinarily the amount of modifier which is used should be within the limits of a few tenths of one per cent up to about 5 per cent. The mixture of alkali halide and modifier is subjected to fusion the temperature being regulated not to rise much above the melting point of the mixture. The fusion temperature should be maintained until the melted mass has become clear and transparent and free from the agitation which occurs when a fusion heat is first applied. The modified mixture after fusion is ground and compressed into a pellet for insertion in the holder.

When the lithium iodide first is vaporized, the resulting film tends to be transparent. It is more satisfactory when whitened by a few minutes exposure to water vapor at a pressure of about 4.5 to 7.0 millimeters of mercury corresponding to the vapor pressure of water at a temperature within the range of about 0° to 6° C., followed by a bake-out before the top film is deposited thereon.

A compound film 31, Fig. 3, of good color contrast can also be made by vaporizing simultaneously the two halides, such as potassium chloride and potassium bromide, providing it be done by separate operations. In this case, the relative amounts of each one are so adjusted that the color contrast desired is obtained. Deposition from a suspension in a liquid of the two pulverized halides suspended together is an alternative method of producing the film. However, it is not satisfactory to vaporize a mixture of the two halides. In this case the color contrast is either poor or absent, due to some interaction between the two halides when heated in contact with one another.

What I claim as new and desire to secure by Letters Patent of the United States is:

1. A cathode ray screen comprising the combination of alkali halides which respond when bombarded with electrons by forming traces of unlike coloration and unlike persistence.

2. A cathode ray screen comprising the combination of a plurality of superimposed layers of alkali halides, said layers responding when bombarded with cathode rays by forming traces of unlike coloration and unlike persistence.

3. A cathode ray screen comprising a layer of potassium chloride and a layer of potassium bromide directly superimposed on said chloride layer.

4. A cathode ray screen comprising a layer of potassium chloride and a layer of rubidium chloride directly superimposed on said chloride layer.

5. A cathode ray device comprising a glass envelope provided with a window, a coating of luminescent material on said window comprising a plurality of alkali halides which respectively respond to electron excitation by having formed therein traces of contrasting color and of unlike persistence.

6. A cathode ray device comprising the combination of a screen which is made up of alkali halides responding to electron bombardment by forming traces of unlike coloration and unlike persistence, means for subjecting said screen to a cathode ray beam and means for moving said beam over said screen to form a linear trace permitting visual observation of color contrasts between different portions of the linear extent of said trace.

7. A cathode ray device comprising the combination of a foundation of glass, a layer of alkali halide therein which responds to cathode ray excitation by having formed therein a dark coloration and superimposed thereon a layer of potassium bromide of lesser thickness which responds to cathode ray excitation by having formed therein a contrasting coloration, and means for subjecting said layers simultaneously to a cathode ray beam.

8. A cathode ray screen comprising the combination of a foundation of glass, a layer of potassium chloride thereon which responds to cathode ray excitation by the formation of a magenta coloration and a superimposed layer of lesser thickness of a halide chosen from the group consisting of rubidium chloride and potassium bromide which respond to cathode ray excitation by the formation of a greenish coloration; said colorations having unlike persistence.

GORTON R. FONDA.

REFERENCES CITED

The following references are of record in the file of this patent:

UNITED STATES PATENTS

| Number | Name | Date |
| --- | --- | --- |
| 2,330,172 | Rosenthal | Sept. 21, 1943 |
| 2,330,171 | Rosenthal | Sept. 21, 1943 |
| 2,303,563 | Law | Dec. 1, 1942 |